(12) United States Patent
Rabii et al.

(10) Patent No.: US 9,052,740 B2
(45) Date of Patent: Jun. 9, 2015

(54) ADAPTIVE DATA PATH FOR COMPUTER-VISION APPLICATIONS

(71) Applicant: QUALCOMM Incorporated, San Diego (CA)

(72) Inventors: Khosro M. Rabii, San Diego, CA (US); Francis B. MacDougall, Toronto (CA); Evan R. Hildreth, Thornhill (CA)

(73) Assignee: Qualcomm Incorporated, San Diego, CA (US)

( * ) Notice: Subject to any disclaimer, the term of this patent is extended or adjusted under 35 U.S.C. 154(b) by 148 days.

(21) Appl. No.: 13/797,580

(22) Filed: Mar. 12, 2013

(65) Prior Publication Data

US 2014/0267790 A1    Sep. 18, 2014

(51) Int. Cl.
*G06F 3/00* (2006.01)
*G06T 1/20* (2006.01)

(52) U.S. Cl.
CPC .. *G06F 3/005* (2013.01); *G06T 1/20* (2013.01)

(58) Field of Classification Search
CPC ........... H04N 5/23219; H04N 5/23241; G06F 3/005; G06T 1/20
USPC .............................. 348/222.1, 231.6, 207.99
See application file for complete search history.

(56) References Cited

U.S. PATENT DOCUMENTS

| | | | |
|---|---|---|---|
| 7,327,396 B2 | 2/2008 | Schultz et al. | |
| 7,598,985 B2 * | 10/2009 | Sasaki | 348/222.1 |
| 8,013,902 B2 | 9/2011 | Ozaki | |
| 2005/0046730 A1 * | 3/2005 | Li | 348/333.12 |
| 2007/0040915 A1 | 2/2007 | Suzuki et al. | |
| 2010/0309511 A1 * | 12/2010 | Ito | 358/1.15 |
| 2011/0298948 A1 * | 12/2011 | Park et al. | 348/231.99 |
| 2012/0182454 A1 | 7/2012 | Schwartz et al. | |

OTHER PUBLICATIONS

Forrer, "Arm and body gesture recognition," University of Fribourg, Fribourg Switzerland, Document created Mar. 26, 2010, 5 pp.
Similar Dreams Book #2, "Multimodal user interfaces: from signals to interaction," Ed. Dimitrios Tzovaras, published Mar. 19, 2008, 372 pp.
Thalmann, "Gesture Recognition: Motion Capture, Motion Retargeting, and Action Recognition," EPFL—VRlab, PowerPoint Document created Apr. 27, 2009, 22 pp.
Westerman, "Hand Tracking, Finger Identification, and Chordic Manipulation on a Multi-Touch Surface," Dissertation submitted to University of Delaware, Spring 1999, 363 pp.
Yang, et al., "Detecting Faces in Images: A Survey," Course slides presented by Neal Audenaert, 2007, Retrieved from URL: http://courses.cs.tamu.edu/rgutier/cpsc689_s07/yang2002faceDetectionSurveySLIDES.pdf 38pp.

(Continued)

*Primary Examiner* — Nhan T Tran
(74) *Attorney, Agent, or Firm* — Kilpatrick Townsend & Stockton LLP

(57) ABSTRACT

Embodiments of the present invention provide an adaptive data path for computer-vision applications. Utilizing techniques provided herein, the data path can adapt to the needs of a computer-vision application to provide the needed data. The data path can be adapted by applying one or more filters to image data from one or more sensors. Some embodiments may utilize a computer-vision processing unit comprising a specialized instruction-based, in-line processor capable of interpreting commands from a computer-vision application.

22 Claims, 8 Drawing Sheets

(56) References Cited

OTHER PUBLICATIONS

Chen, J C., et al., "CRISP: Coarse-Grained Reconfigurable Image Stream Processor for Digital Still Cameras and Camcorders", IEEE Transactions on Circuits and Systems for Video Technology, Sep. 1, 2008, vol. 18, No. 9, pp. 1223-1236.

Fung, J., et al., "OpenVIDIA: Parallel GPU Computer Vision", ACM Multimedia, 2004 Proceedings of the 12th ACM International Conference on Multimedia, Oct. 10-16, 2004, pp. 849-852.

International Search Report and Written Opinion—PCT/US2014/018943—ISA/EPO—Jun. 2, 2014.

Pramod, P., et al., "Optimization of Image Processing Algorithms on Mobile Platforms", Real-Time Image and Video Processing 2011, SPIE, vol. 7871, No. 1, Feb. 10, 2011, 14 pages.

Thevennin, M., et al., "The eISP low-power and tiny silicon footprint programmable video architecture", Journal of Real-Time Image Processing, Jun. 17, 2010, vol. 6, No. 1, pp. 33-46.

\* cited by examiner

ADAPTIVE DATA PATH FOR COMPUTER-VISION APPLICATIONS

BACKGROUND

Mobile phones, cameras, and other electronic devices often utilize an imaging core to capture and process imaging data for imaging applications such as video or still image capture. The imaging core includes a collection of hardware and/or software components providing a data path through which data can flow from an image sensor (e.g., camera) to an application processing unit, such as a general purpose processor, and/or a display. In many electronic devices, the imaging core is also utilized for computer-vision applications (also known as "machine-vision applications").

SUMMARY

Embodiments of the present invention provide an adaptive data path for computer-vision applications. Utilizing techniques provided herein, the data path can adapt to a computer-vision application to provide data. The data path can be adapted by applying one or more filters to image data from one or more sensors. Some embodiments may utilize a computer-vision processing unit comprising a specialized instruction-based, in-line processor capable of interpreting commands from a computer-vision application.

An example apparatus for providing an adaptive data path for computer-vision applications, according to the disclosure, includes an application processing unit and a processing unit, separately programmable from the application processing unit, and communicatively coupled to an image sensor module and the application processing unit. The processing unit is configured to receive a first image from the image sensor module, select a first subset of image processing functions from a plurality of image processing functions, based on a first computer-vision application executed by the application processing unit, and process the first image using the first subset of image processing functions.

An example method for providing an adaptive data path for computer-vision applications, according to the disclosure, includes receiving a first image, selecting a first subset of image processing functions from a plurality of image processing functions, based on a first computer-vision application executed by an application processing unit, and processing the first image, using the first subset of image processing functions. The processing occurs in a unit separate from the application processing unit.

An example processor for providing an adaptive data path for computer-vision applications, according to the disclosure, includes means for receiving a first image, means for selecting a first subset of image processing functions from a plurality of image processing functions, based on a first computer-vision application executed by an application processing unit, and means for processing the first image, using the first subset of image processing functions. The means for processing the first image are separate from the application processing unit.

An example non-transitory computer-readable medium, according to the disclosure, is encoded with instructions that, when executed, operate to cause a processing unit to perform operations including receiving a first image, selecting a first subset of image processing functions from a plurality of image processing functions, based on a first computer-vision application executed by an application processing unit, and processing the first image, using the first subset of image processing functions.

An example method, according to the description, includes receiving at an image signal processor information derived from an image captured by an optical sensor, and receiving at the image signal processor an indicator of data for output. The method further includes processing the received information based on the received indicator, and outputting the processed information.

The method can include one or more of the following features. The indicator of data for output can include an indication of an application for which data is being generated or a type of application for which data is being generated. The indicator of data for output can include an indication of a type of data requested. The processing can include reducing an amount or type of the received information, and/or comparing the received information to desired features and removing portions of the received information that are irrelevant to the desired features. Additionally or alternatively, the processing can include comparing the received information to known information, and outputting the processed information can include outputting an alert when the received information differs from the known information. The processing can include identifying or generating the data for output from the received information, and the outputting the processed information can include waking another unit up (e.g., causing another unit to exit a low-power state by sending a signal, command, etc.) only when the data is generated or identified. The other unit can be an application processor.

Another example method, according to the disclosure, can include receiving at an image signal processor information from an optical sensor, and receiving at the image signal processor an identification of a computer vision application, a type of computer vision application, or a state of a computer vision application. The method can further include selecting a computer vision module of the image signal processor based on the identification, and processing the information at the image signal processor with the selected computer vision module.

Yet another example method, according to the disclosure, can include receiving at an image signal processor information derived from an image captured by an optical sensor, processing the received information, and outputting the processed information from the image signal processor to an application processor based on an application or application state which will consume the processed information.

The method can include one or more of the following features. A type or amount of the processed information can be dependent on the application or application state. The application can include a computer vision application. The processed information can include pixel data for further processing by the application, and/or an interrupt or wakeup for the application processor. The application processor can be asleep (e.g., in a low-power state) while the image signal processor is processing the received information. The method can further include selecting a data path in the image signal processor based on the application or application state, where the processing comprises processing the received information using the selected data path.

Items and/or techniques described herein may provide one or more of the following capabilities, as well as other capabilities not mentioned. Techniques can provide for increased efficiency by adapting the data path to computer-vision applications, thereby reducing processing overhead. Furthermore, by offloading computer-vision functionality from an application processing unit to the data path, the application processing unit can enter a low-power mode of operation while the data path performs the offloaded functions, further reducing power and processing demands. These and other embodi-

DETAILED DESCRIPTION

Figure 1:
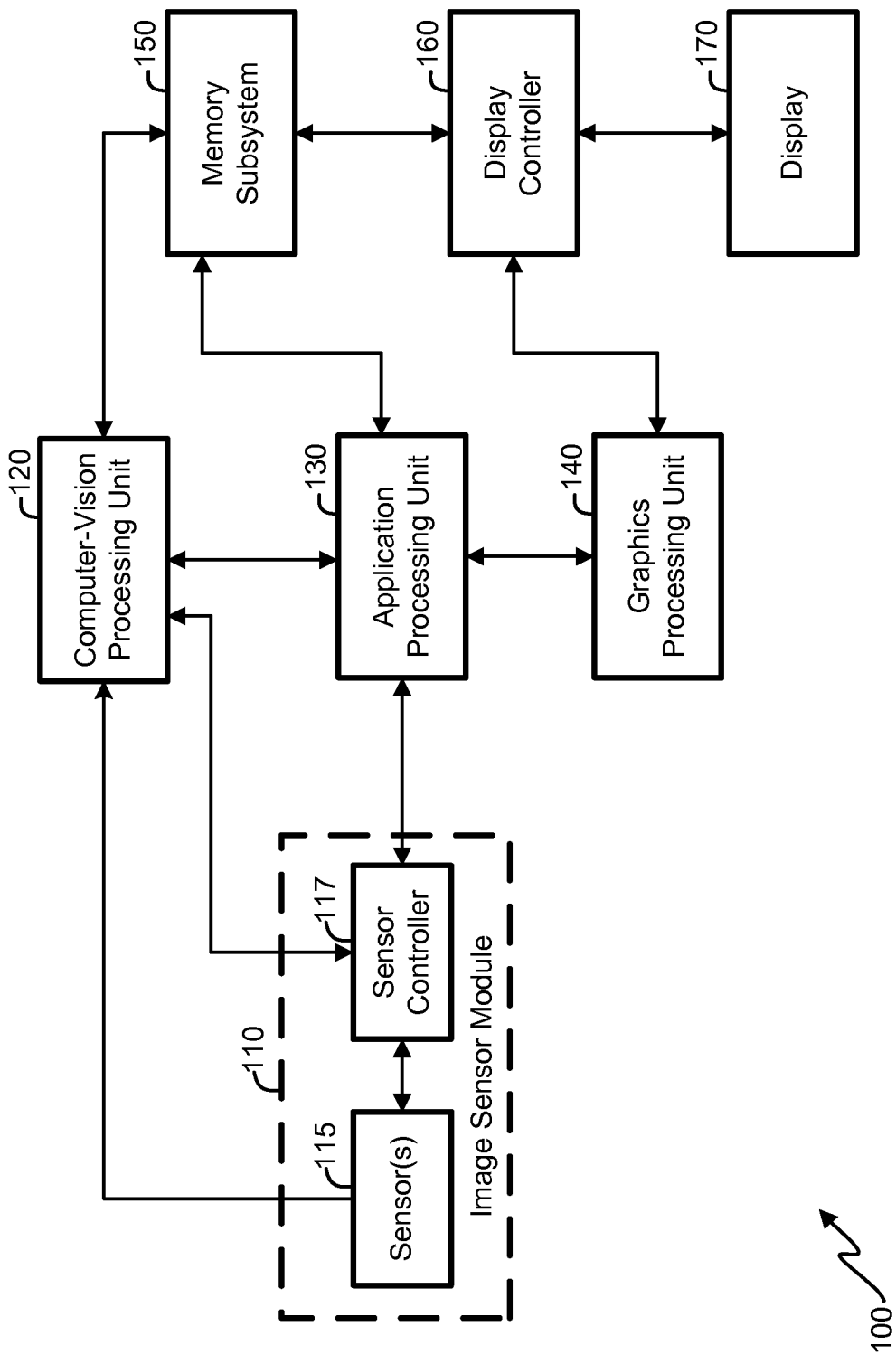
FIG. 1 is a simplified block diagram illustrating certain components of a device, according to one embodiment.

The following description is provided with reference to the drawings, where like reference numerals are used to refer to like elements throughout. While various details of one or more techniques are described herein, other techniques are also possible. In some instances, structures and devices are shown in block diagram form in order to facilitate describing various techniques.

Mobile devices such as mobile phones, tablets, cameras, and the like often utilize an imaging core when capturing and processing imaging data for imaging applications such as video or still image capture. To execute imaging applications, mobile devices typically include one or more sensors allowing for image capture, a data path (implemented in hardware and/or software) that brings imaging data from the sensor(s) into the platform, and some processing. Because mobile devices have been historically used for imaging applications, mobile devices usually include an imaging core with a data path that is configured primarily for imaging applications.

However, many mobile devices are now capable of additionally executing computer-vision applications. In contrast to imaging applications, which typically include a limited number of applications dealing with camera- and camcorder-related functions, computer-vision applications can include a wide variety of applications providing an equally-wide spectrum of functionality. For example, computer-vision applications can provide one or more of the following functions:
1. Detection of a variance in light,
2. Detection of a variation in viewing scene,
3. Visual object detection,
4. Visual object feature detection (e.g., colors, proximity, motion, etc. of a visual object),
5. Object tracking, and/or
6. Platform stability detection.

Some computer-vision applications may provide other functions in addition or as an alternative to these functions. Indeed, as the sensing and processing capabilities of mobile devices continue to grow, additional functions will likely emerge.

In providing a sufficient data path for such computer-vision applications, a mobile device may switch operation between active states, requiring a relatively large amount of processing, and states requiring relatively little amount of processing. Low-processing states are, for example, states in which the computer-vision applications do not receive features of interest from the data path that would require relatively high amounts of processing. For mobile devices which are battery powered, efficient execution of both high- and low-processing states can provide longer battery life. However, as noted previously, the imaging core for mobile devices typically has a fixed data path with functionality favoring imaging applications; the data path being configured, for example, to provide images with high resolutions and/or at high frame rates. Thus, rather than providing a data path that can allow the mobile device to efficiently execute both high- and low-processing states for computer-vision applications, traditional mobile devices will often provide data paths with much more overhead than necessary. Additionally, because data paths in traditional mobile devices often will not provide filtering needed by computer-vision applications, much of this filtering takes place on a general application processing unit. This can not only adversely affect the electronic device's battery life, but also a user's quality of experience (QOE). Embodiments disclosed herein provide for an adaptive data path for computer-vision applications that can adjust to requirements of computer-vision applications, offloading filters for computer-vision applications from an application processing unit to the data path, and providing different data (and different types of data) to the application processing unit, depending on the computer-vision applications. This ultimately provides for increased battery life and/or QOE.

FIG. 1 is a block diagram illustrating certain components of a device 100 having an adaptive data path for computer-vision applications, according to one embodiment. The components can include sensor(s) 115, a sensor controller 117, an application processing unit 130, graphics processing unit 140, display 170, display controller 160, memory subsystem 150, and a computer-vision processing unit 120. The device 100 can include various additional components that are not shown, such as a communication interface, user interface, and more. As with other figures provided herein, FIG. 1 is meant only to provide a generalized illustration of various components, any or all of which may be utilized as appropriate. Different embodiments may add, omit, substitute, combine, and/or divide any of the components shown. A person of ordinary skill in the art will recognize many alterations.

In some embodiments, the device 100 comprises a mobile device. For example, the device 100 may comprise a mobile phone, tablet, personal media player, portable gaming system, digital camera, camcorder, and the like. It can be noted that, although techniques provided herein can be utilized on mobile devices to provide power savings and/or other advantages such as reduced latency in some embodiments, the device 100 is not so limited. That is, embodiments may include devices 100 and may not be considered mobile. For example, a television may include a data path for imaging applications (e.g., a video conferencing application) and a data path for machine-vision (e.g., a gesture control application). A game system may include a data path for imaging applications (e.g., in-game video chat) and a data path for machine-vision (e.g., gesture and/or body control). Other embodiments involving non-mobile devices are contemplated.

The sensor(s) 115 can include one or more of a variety of sensors, depending on the functionality of the device 100. This can include sensors that are not associated with camera or camcorder functions. The sensor(s) could include, for example, sensor(s) for detecting infrared (IR) and/or near IR, sensor(s) for determining different colorimetry, sensor(s) for determining depth (e.g., time-of-flight, structured-light, etc.), as well as one or more cameras (e.g., stereoscopic cameras, front- and/or back-facing cameras, etc.), and/or other imaging sensor(s).

The sensor controller 117 can provide an interface with the sensor(s) 115. The sensor controller 117 can control the sensor(s) 115 based on input from other components, such as the application processing unit 130 and/or the computer-vision processing unit 120. In some embodiments, the sensor controller 117 can provide, for example, while-balance control, exposure control, focus control, binning & skip control, 2D/3D windowing/boxing, and/or other functions. The sensor(s) 115 and/or sensor controller 117 can form at least a portion of an image sensor module 110 of the device 100.

The application processing unit 130 can include without limitation one or more general-purpose processors, one or more special-purpose processors (such as digital signal processors, graphics acceleration processors, and/or the like), and/or other processing structure, which can be configured to execute computer-vision and other software applications, which may be stored in the memory subsystem 150. In some embodiments, the application processing unit 130 comprises an application or "apps" processor configured with one or more cores.

The memory subsystem 150 can include one or more non-transitory computer-readable storage media providing application and/or system storage. Such storage devices can include a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Software elements can be included in the memory subsystem as instructions embedded on the one or more non-transitory computer-readable storage media. Such software elements can include an operating system, device drivers, executable libraries, and/or other code, such as one or more application programs, which may be designed to cause the application processing unit 130, computer-vision processing unit 120, and/or other components to implement methods (or portions thereof), and/or configure systems, as provided by embodiments described herein. Merely by way of example, one or more procedures described herein, including the method described with respect to FIG. 7, might be implemented as code and/or instructions executable by the computer-vision processing unit 120 and/or application processing unit 130.

The graphics processing unit 140 and display controller 160 can be used to show one or more images on a display 170, depending on the application(s) executed by the application processing unit 130. It can be noted that imaging applications such as video or still image capture typically display images, and therefore require the utilization of the display 170, display controller 160, and/or graphics processing unit 140. Many computer-vision applications, on the other hand, may not need to utilize these components at all. Accordingly, these components of the device 100 can be included or excluded from the data path to adapt to computer-vision applications executed by the application processing unit 130.

The computer-vision processing unit 120 can include hardware and/or software subcomponents for providing an adaptive data path from the sensor(s) 115 to the application processing unit 130. This can include, for example, a video front end (VFE), image-signal processor (ISP), digital-signal processor (DSP), and/or other processing unit separately programmable from the application processing unit. Optionally, the computer-vision processing unit 120 can read from and/or write to the memory subsystem 150. In some embodiments, the computer-vision processing unit 120 can be dynamically programmed, based on a computer-vision application executed by the application processing unit 130. Accordingly, the computer-vision processing unit 120 may execute applications stored in the memory subsystem 150 and/or a memory internal to the computer-vision processing unit 120 (which can include features similar to those described above in relation to the memory subsystem 150). In some embodiments, depending on the size of the memory internal to the computer-vision processing unit 120 and/or needs of a computer-vision application, the computer-vision processing unit 120 may be able to provide the adaptive data path without the use of the memory subsystem 150, thereby enabling the memory subsystem 150 to enter a low-power mode in addition to the application processing unit 130.

In one embodiment, the computer-vision processing unit 120 can comprise a specialized instruction-based, in-line processor adapted to implement various filters for computer-vision applications. As such, the computer-vision applications can call the instructions to implement the filter(s) needed without the need to utilize an interpretive engine in some embodiments. In other words, filters implemented by the computer-vision processing unit 120 can correspond to a set of standardized instruction-based commands tied to an interpretive language that is translated, in real time, by the specialized instruction-based, in-line processor to identify the needed filter(s) for the computer-vision application.

Techniques provided herein for an adaptive data path for computer-vision applications can enable programmability controlled at an application layer. That is, a computer-vision application executed by the application processing unit 130 can provide instructions and/or other information to the computer-vision processing unit 120 at any time in some embodiments. Such functionality grants the application more power, allowing for a dynamically programmable computer-vision processing unit 120 that provides computer-vision data in an efficient manner, without any additional knowledge of the context in which the computer-vision data is used. The computer-vision application can determine the context and provide instructions to the computer-vision processing unit 120 accordingly. As indicated above, embodiments can allow computer-vision applications to call instructions to implement desired filter(s) without the need to utilize an interpretive engine.

It will be apparent to those skilled in the art that substantial variations may be made to the components shown in FIG. 1 in accordance with specific requirements. For example, customized hardware might also be used, and/or particular elements might be implemented in hardware, software, or both, in addition or as an alternative to the descriptions above. Further, connection to other devices and/or sensors may be employed.

Figure 2:
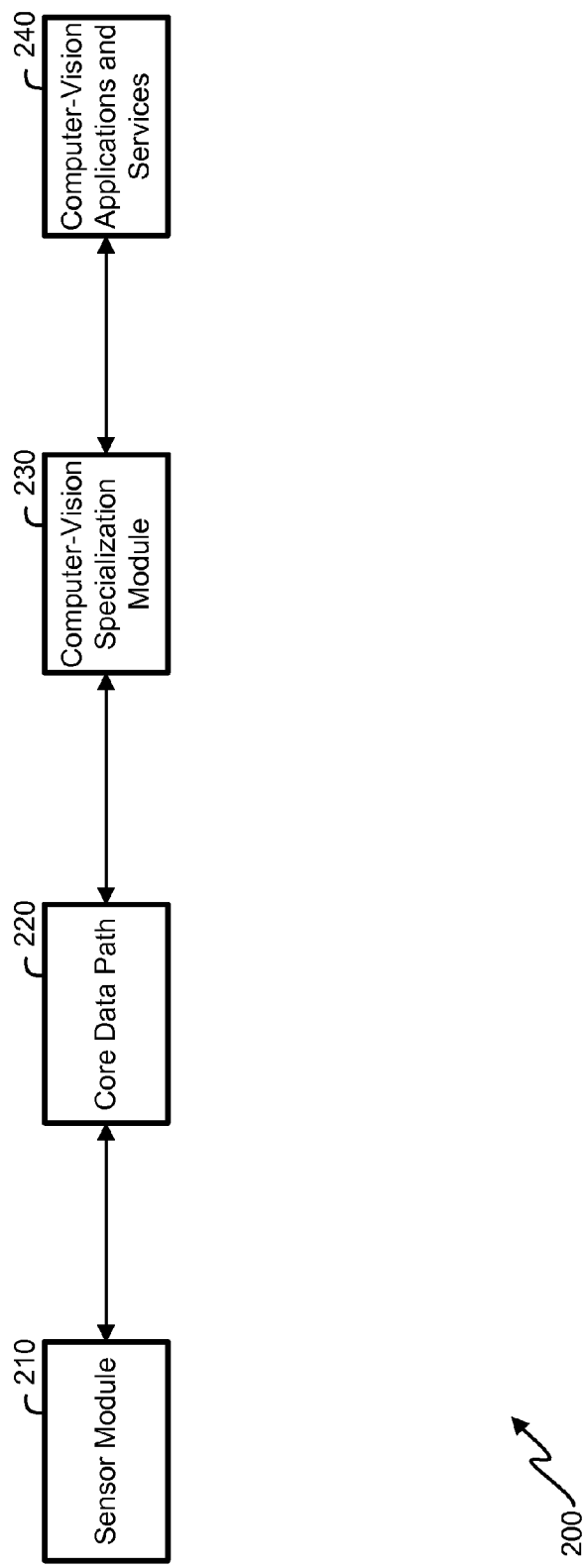
FIG. 2 is a functional block diagram illustrating a data path for providing data from a sensor module to computer-vision applications and services, according to one embodiment.

FIG. 2 is a functional block diagram illustrating a data path 200 providing data from a sensor module 210 to computer-vision applications and services 240, according to one embodiment. The data path 200 can be executed by one or more components of the device 100 of FIG. 1, and/or similar means. In addition to the sensor module 210 and computer-vision applications and services 240, the data path 200 can include a core data path 220 and a computer-vision specialization module 230. Other embodiments may vary from the embodiment shown by utilizing different competent in a similar functional manner. A person of ordinary skill in the art will recognize many alterations.

The sensor module 210 can comprise sensors and/or other components that output sensor data, such as the image sensor module 110 of FIG. 1, and/or similar means. Depending on the functionality of the device 100 and/or the capabilities of the sensor(s) of the sensor module 210, the data from the sensor module can vary. The data from the sensor module 210 is then passed to the core data path 220.

The functionality of the core data path 220 can provide an interface between the sensor module 210 and the computer-vision specialization module 230. It may be adapted to accommodate specific sensor data of the sensor module 210 and output the data in a uniform manner, according to some embodiments. Furthermore, the core data path 220 may perform some initial processing of the data of the sensor module 210, employing, for example, certain filters that are used in imaging applications, computer-vision applications, and/or other common applications executable by the device 100. Such filters can include, for example, optimization filters for lighting, color, exposure, focus, and the like. The core data path 220 may be implemented by portions of the computer-vision processing unit 120 and/or image sensor module 110 of FIG. 1, as well as one or more intermediary components (not shown), and/or similar means. In some embodiments the core data path 220 may be implemented, at least in part, by a video front end (VFE).

The computer-vision specialization module 230 comprises an adaptable component of the data path 200 that can be executed by the computer-vision processing unit 120 and/or memory subsystem 150 of FIG. 1. The computer-vision specialization module 230 is configured to determine an input for computer-vision applications and services 240 and adapt the data path accordingly, thereby adapting the data from the sensor module 210 to the input for the computer-vision applications and services 240. For example, the computer-vision specialization module 230 can determine the input based on a requirement or need of one or more of the computer-vision applications and services 240 or based on an instruction therefrom or an interface thereof. In particular, the computer-vision specialization module 230 can receive an image (or other data) from the sensor module 210, via the core data path 220, and process the image using at least a subset of available image processing functions (also referred to herein as "filters") based on the needs of the computer-vision applications and services 240. In some embodiments, the computer-vision specialization module 230 or portions of its functionality is implemented by an ISP.

The computer-vision applications and services 240 can be executed by the application processing unit 130 and/or the memory subsystem 150 of FIG. 1, and/or similar means. As discussed in more detail below, the computer-vision applications and services 240 can provide an indication of desired data or information to the computer-vision specialization module 230 by providing the computer-vision specialization module 230 with a reference (an image, command, etc.). As disclosed previously, computer-vision applications (and the needs thereof) can vary substantially, depending on application. It will be understood that computer-vision applications and services 240, as described herein, can include one or more computer-vision applications and/or computer-vision services. Where multiple computer-vision applications and/or services have many needs, the computer-vision specialization module 230 can provide an optimal data path to serve the needs of all of them in some embodiments.

Figure 3:
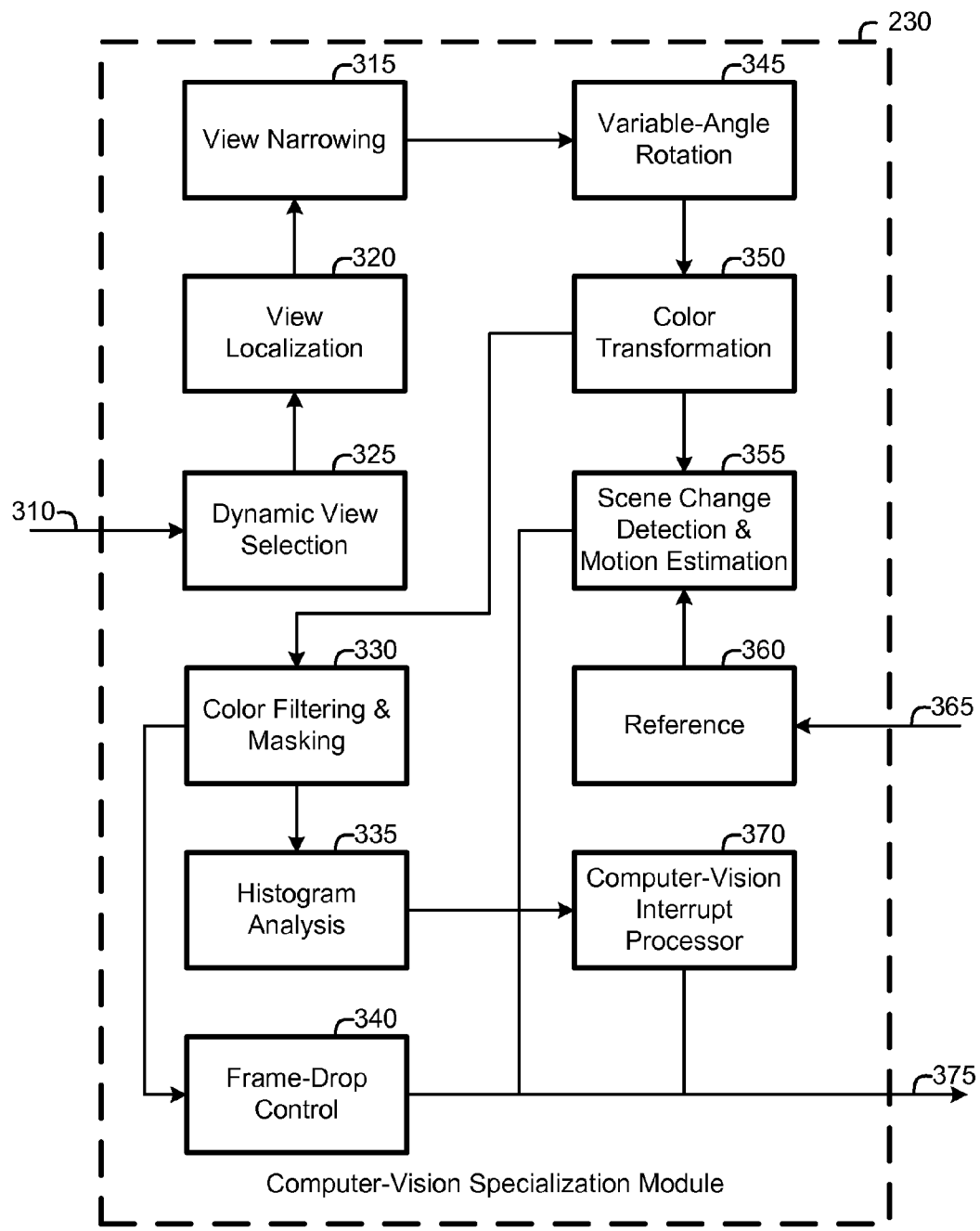
FIG. 3 is a diagram of a set of available filters of a computer-vision specialization module, according to one embodiment.

FIG. 3 illustrates a set of available filters 315-355 of a computer-vision specialization module 230, according to one embodiment. In some embodiments, the filters are at least partially implemented in hardware, providing faster, more-efficient filtering than if executed in software alone. Further, implementation of such filters in the computer-vision specialization module 230 instead of in the computer-vision applications and services 240 and/or the application processing unit 130 may increase processing speed and/or reduce power consumption in some embodiments. Although FIG. 3 illustrates the filters as providing a certain data path from an input 310 received from the core data path 220 to an output 375 provided to the computer-vision applications and services 240 in a particular order, the order can be altered, depending on application. Moreover, filters can be added, omitted, substituted, combined, and/or divided depending on application. Further, any one or more of the filters may be selected for use for a given function or process without necessitating the use of other filters in the computer-vision specialization module 230 in some embodiments.

To indicate needs, the computer-vision applications and services 240 can provide a reference 360 via an input 365. Depending on the application, the reference can be, for example, a reference image. The reference can, additionally or alternatively, include information about an image (e.g., a histogram providing a color distribution for an image). Optionally, the reference can include a command or set of instructions from the computer-vision applications and services 240, which may adhere to a certain protocol and/or instruction set. In some instances, a reference may be obtained by the computer-vision specialization module 230 directly from the core data path 220 in addition or as an alternative to receiving a reference from computer-vision applications and services 240. Once the reference is obtained, the computer-vision specialization module 230 can store it in memory.

Dynamic view selection 325 may be configured to select a certain view for subsequent processing. In particular, depending on the computer-vision application, a field of view can be sampled by multiple image-sensors (e.g., at the least two for stereo-imaging). As such, the field of view from several image-sensors can be dynamically adjusted to minimize the required processing for computer-vision. In one example, hand-gesture recognition may track a hand, the image of which is captured by multiple image sensors. Dynamic view selection 325 can select, from the plurality of images, the best image for hand tracking. In another example, the dynamic view selection 325 may track a fiducial marker and select the image with the best view of (e.g. most perpendicular to) the fiducial marker, for example for use with an augmented reality (AR) application. This can help reduce subsequent processing by reducing the amount of images to process.

View narrowing 315 and view localization 320 may be configured to remove portions of an image an application is not interested in. For example, a particular computer-vision application may be interested in a particular object that is placed in one quadrant of a 2-megapixel image. In such a case, only a portion of the image (e.g., 500,000 pixels) would need to be processed and passed to the computer-vision applications and services 240. Accordingly, the computer-vision specialization module 230 can be adapted to employ view narrowing 315 to, for example, isolate the relevant portion of the image and/or estimate the number of pixels and/or lines that represent the object. As needs of the computer-vision applications and services 240 change (e.g., the particular computer-vision application enters a different state and/or another computer-vision application is executed), the computer-vision specialization module 230 can adapt accordingly. Thus, the computer-vision specialization module 230 can use view narrowing 315 and/or view localization 320 to provide different resolutions at different times.

Variable-angle rotation 345 may be configured to rotate an image and/or object within an image with respect to a sensor capturing the image. For example, a computer-vision application may only identify a rectangle in an image when the rectangle is in a certain orientation respect to a sensor. Rather than forcing a computer-vision application to execute algorithms for adjusting the image's orientation (e.g., running the algorithms on the application processing unit 130), the computer-vision specialization module 230 can adapt the data path to rotate all or a portion of the image using the variable-angle rotation 345.

Color transformation 350, color filtering & masking 330, and histogram analysis 335 can be implemented in the data path when, for example, the computer-vision applications and services 240 indicate a need for color-recognition, and/or manipulation.

Frame-drop control 340 may be configured to reduce the amount of images (frames) delivered to the computer-vision applications and services 240, thereby reducing bandwidth and power needs. For example, once programmed, a sensor of the sensor module 210 may deliver a certain amount of frames per second. However, if this amount is larger than what the computer-vision applications and services 240 needs, the data path can be configured to drop any extra frames using the frame-drop control 340.

Scene change detection & motion estimation 355 may be configured to determine whether a change in sensor input has occurred. The change can be determined, for example, by comparing a current image with a past image. As indicated previously, a past image may be maintained as a reference 360, retrieved from the data path or received from the computer-vision applications and services 240 via input 365.

Although not illustrated in FIG. 3, the computer-vision specialization module 230 may also include one or more filters configured to identify and/or output features, and/or one or more modules configured to track elements or features and/or output a position thereof. For example, the computer-vision specialization module 230 may comprise one or more functions configured to extract features from an image such as a Scale Invariant Feature Transform (SIFT), PhonySIFT, Speeded-up Robust Features (SURF), and/or Features from Accelerated Segment Test (FAST) corner detector. Further, the functions may include one or more functions to compute spectral features or characteristics.

The computer-vision specialization module 230 can also include a computer-vision interrupt processor 370. With the computer-vision interrupt processor 370, a computer-vision specialization module 230 can allow the underlying hardware executing the computer-vision applications and services 240 (e.g., an application processing unit 130 and/or memory subsystem 150) to enter a low-power (e.g., "standby") mode. When the computer-vision specialization module 230 determines that a triggering event has taken place, the computer-vision specialization module 230 can utilize the computer-vision interrupt processor 370 to provide an interrupt to underlying hardware to cause the underlying hardware to exit the low-power mode.

When combined with other filters, the computer-vision interrupt processor 370 can allow the computer-vision specialization module 230 to perform a variety of functions in the data path, while requiring little or no processing from the underlying hardware executing the computer-vision applications and services 240. For example, computer-vision applications and services 240 may include a security application in which the device 100 monitors an area with a camera and sounds an alarm if it detects a change in the monitored area. To preserve battery power, the underlying hardware executing the computer-vision applications and services 240 (e.g., an application processing unit 130 and/or memory subsystem 150) can enter a standby mode while the computer-vision specialization module 230 employs scene change detection & motion estimation 355 to compare sensor input with a reference image of the monitored area. If the scene change detection & motion estimation 355 determines that there is a change in the monitored area (e.g., someone or something enters the scene viewed by the camera), it can notify the computer-vision interrupt processor 370. The computer-vision interrupt processor 370, in turn, can generate an interrupt for the underlying hardware executing the computer-vision applications and services 240, which can then cause the security application to sound the alarm. By providing the computer-vision interrupt processor 370 and scene change detection & motion estimation 355 in the data path in this manner, rather than in the computer-vision applications and services 240, the device 100 is able execute the security application in an efficient manner without unnecessary processing by the underlying hardware executing the computer-vision applications and services 240.

Figure 4:
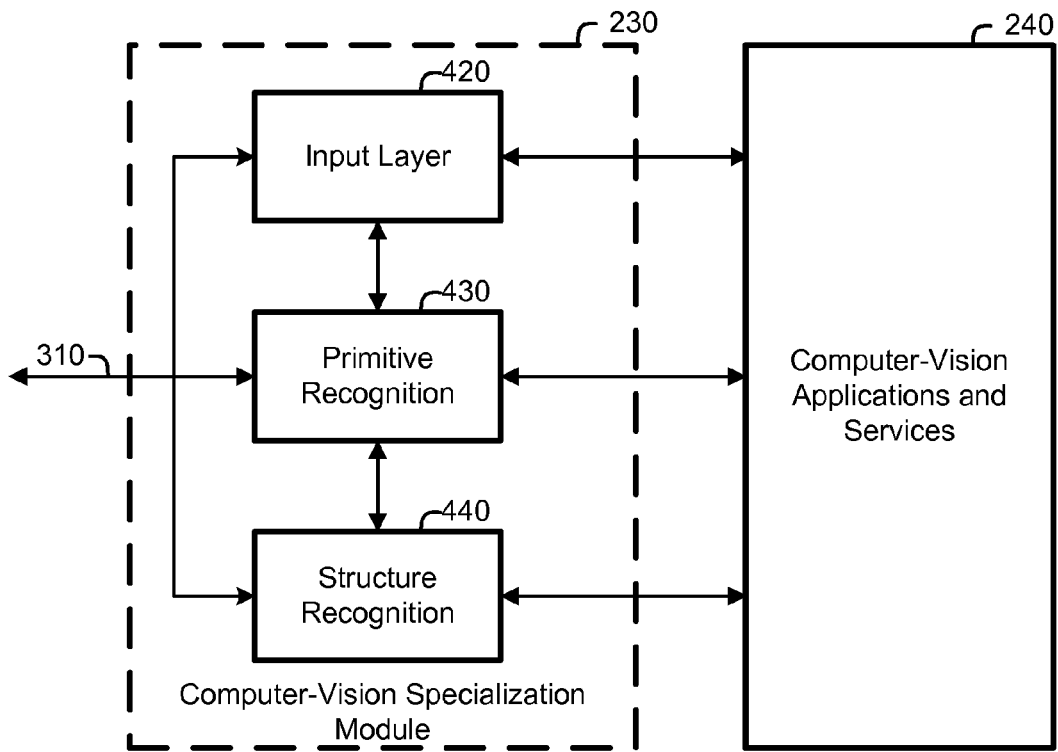
FIG. 4 is a block diagram illustrating how components of the computer-vision specialization module of FIG. 3 can be grouped into different functional portions of the data path.

FIG. 4 is a block diagram 400 illustrating how components of the computer-vision specialization module 230 can be grouped into different functional portions of the data path for computer-vision applications and services 240. For example, components may be grouped into the following functional portions: an input layer 420, primitive recognition 430, and structure recognition 440. Aspects of the data path not included in the computer-vision specialization module 230 (included in the core data path 220, for example) can also contribute to the functionality of the input layer 420, primitive recognition 430, and/or structure recognition 440, depending on desired functionality. That is, the core data path 220 can provide an input 310 for which portions of the input layer 420, primitive recognition 430, and/or structure recognition 440 may have already been performed.

The input layer 420 comprises a portion of the data path that brings in data from the sensor module 210 while potentially reducing the required processing in subsequent computer-vision processing blocks. To do so, the input layer 420 may be configured with one or more image-processing filters including, for example, color transformation 350, color filtering and masking 330, dynamic view selection 325, view localization 320, view narrowing 315, variable-angle rotation 345, color transformation 350, color filtering & masking 330, and/or frame-drop control 340, and the like. Additionally or alternatively, the input layer 420 can provide image-processing filters optimizing environment lighting, color, exposure, and/or focus, as well as filters configured for feature extraction, and/or other filters.

The primitive recognition 430 portion of the data path can be configured based on the needs of the computer-vision applications and services 240. This can include determining whether certain features are present in the data from the sensor module 210. For instance, if the computer-vision applications and services 240 include hand gesture recognition, the primitive recognition 430 could be configured to recognize a hand. For applications interested in certain colors, the primitive recognition 430 could be configured to examine the colorimetry of the data from the sensor module 210 to determine if one or more colors are present. To provide this functionality, the primitive recognition 430 can be configured with one or more image-processing filters including, for example, view localization 320 and/or view narrowing 315, and the like. Additionally or alternatively, the primitive recognition 430 can be configured with image-processing filters including segmentation, posture detection, and/or other filters.

The structure recognition 440 can be configured to track features in the data from the sensor module 210 over time and define structures, which can also be based on the needs of the computer-vision applications and services 240. The features in the data can include identifiable features such as edges, corners, SIFT (scale-invariant feature transform), and the like. Structures defined by the tracked features can include, for example, symbols and/or vision gestures. To provide this functionality, and/or to potentially reduce the required processing in primitive and/or structure recognition processing blocks, the structure recognition 440 can be configured with one or more image-processing filters including, for example, scene change detection & motion estimation 355, frame-drop control 340, histogram analysis 335, and the like. Additionally or alternatively, the structure recognition 440 can be configured with image-processing filters including tracking, prediction, gesture detection, and/or other filters. The tracked features can vary depending on the needs of the application requesting and/or consuming the structure recognition. A gesture-based application, for example, may require tracking of a hand to determine gestures. A context-aware application or augmented reality application, on the other hand, may track any of a variety of objects for object recognition.

Figure 5A:
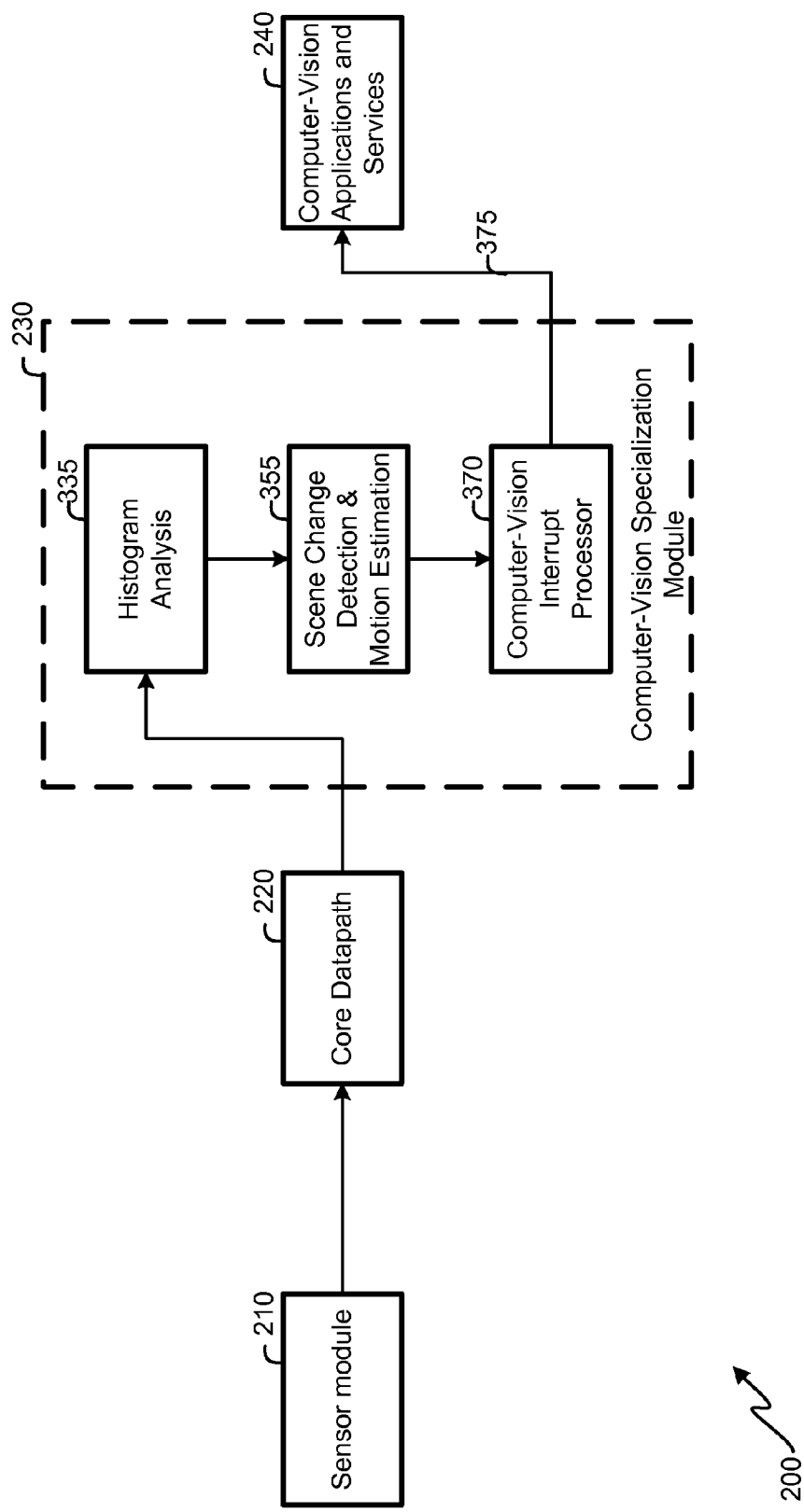
FIGS. 5A and 5B are diagrams illustrating how the computer-vision specialization can employ different filter chains, adaptively adjusting the data path based on the needs of the computer-vision applications and services.
Figure 5B:
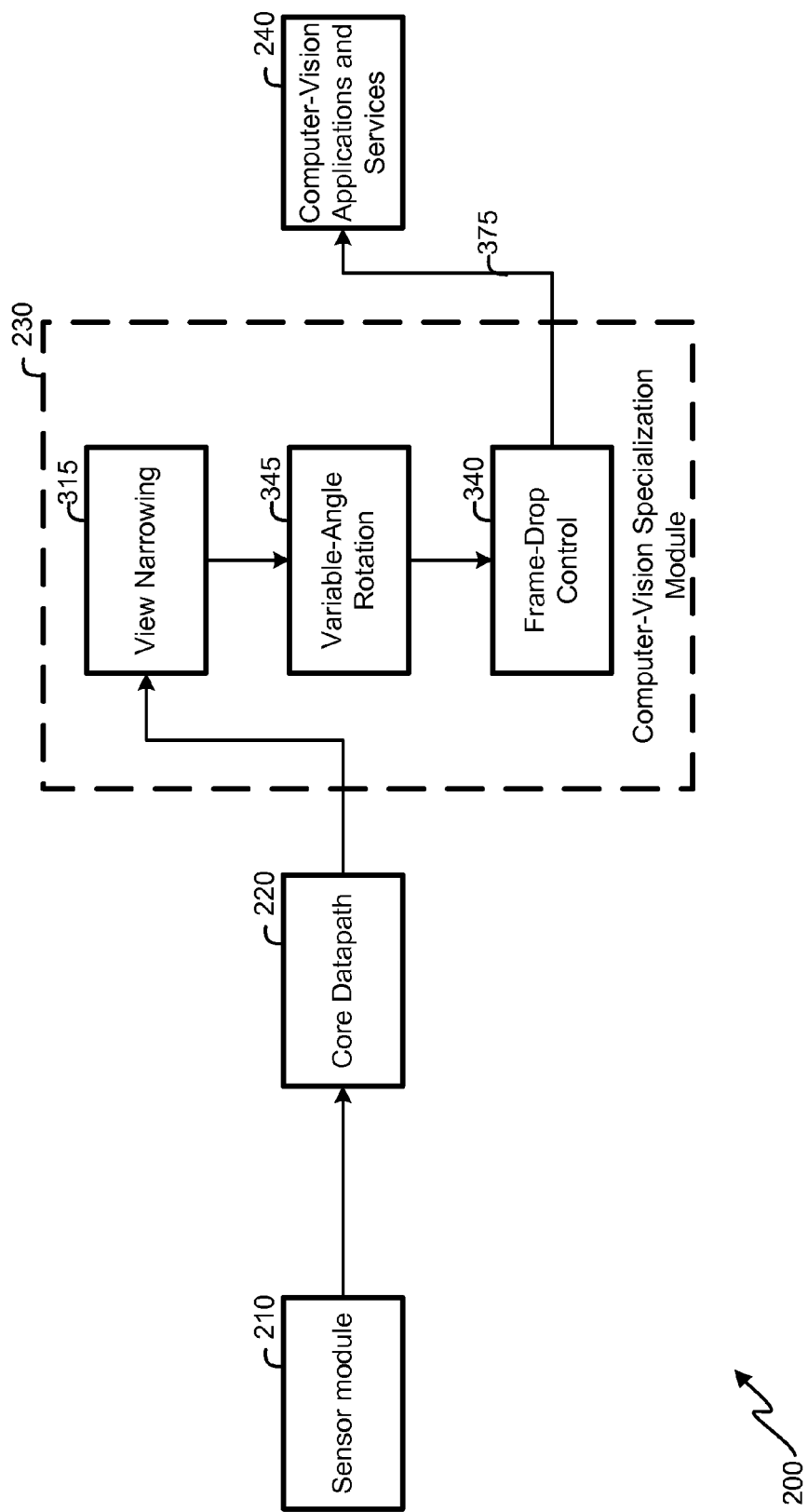

FIGS. 5A and 5B provide examples of how the computer-vision specialization can employ different filter chains, adaptively adjusting the data path 200 based on the needs of the computer-vision applications and services 240. In FIG. 5A, the computer-vision specialization module 230 adapts the data path to a security application by utilizing a filter chain comprising histogram analysis 335, scene change detection & motion estimation 355, and computer-vision interrupt processor 370 to provide an output 375 to the computer-vision applications and services 240. In FIG. 5B, a data path 200 is illustrated in which the computer-vision specialization module 230 adapts the data path to meet the needs of a computer-vision application for object recognition by utilizing a filter chain comprising view narrowing 315, variable-angle rotation 345, and frame-drop control 340. It can be noted that, although the filter chains provided in the examples shown in FIGS. 5A and 5B both include three filters, the computer-vision specialization module 230 can include a larger or smaller amount of filters, based on the needs of the computer-vision applications and services 240.

Parameters for each filter utilized by the computer-vision specialization module 230 can also vary, depending on needs of the computer-vision applications and services 240. For example, view narrowing 315 may be defined to provide the upper-right quadrant of an image for a first application, and a lower-left quadrant of an image for a second application. Furthermore, the computer-vision specialization module 230 may adapt the filters and their parameters according the changing needs of a single application. Thus, not only can the computer-vision specialization module 230 adapt the data path for different computer-vision applications, but also for different states and/or needs of a particular computer-vision application.

Figure 6:
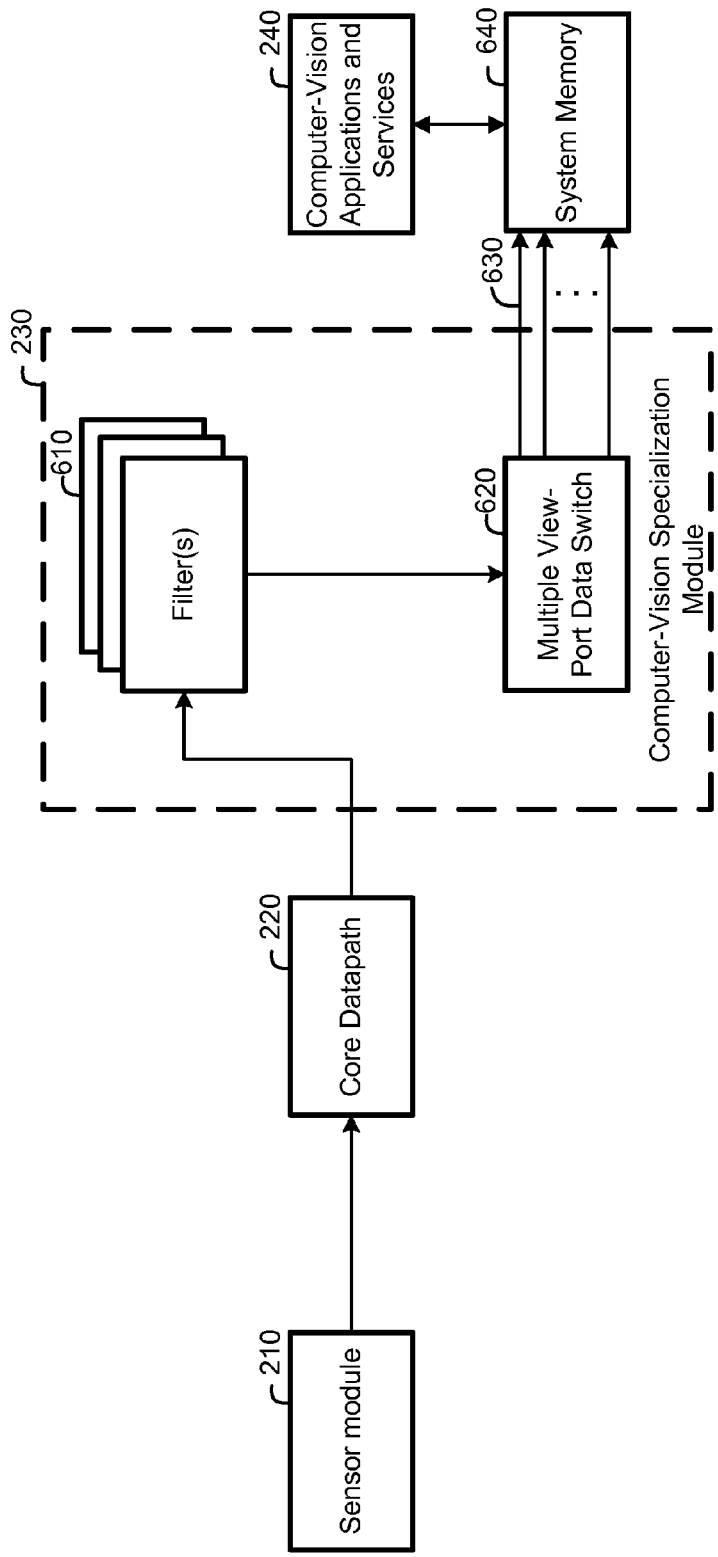
FIG. 6 is an illustration of a data path using data switching to provide data ports for different segments of data, according to one embodiment.

In addition to the filters shown in FIG. 3, embodiments can utilize data switching to provide data ports for different segments of data. An example of this functionality is illustrated in FIG. 6. Here, in addition to any other filter(s) 610 (such as filters 315-355 described in relation to FIG. 3), a computer-vision specialization module 230 can employ a filter chain in which a multiple view-port data switch 620 separates data into different ports 630. With the multiple view-port data switch 620, the data path 200 can separate data from a single image into separate sub-image outputs, as if the images were taken by separate sensors. For example, for a facial-recognition computer-vision application in the computer-vision applications and services 240, the computer-vision specialization module 230 can use the filter(s) 610 and multiple view-port data switch 620 to extract, from an image of the faces of four people, separate images of each face, where the data for each image has a corresponding viewing port 630. The facial-recognition computer-vision application can utilize the data from each port 630 and perform facial recognition from each port 630 separately.

Data switching in this manner can also facilitate how data is tagged in system memory 640 of a device, which can comprise the memory subsystem 150 of FIG. 1. Data tagging can be particularly useful for devices with multiple sensors providing information to the data path 200. As shown in FIG. 6, embodiments can be configured to allow the multiple view-port data switch 620 of a computer-vision specialization module 230 to tag the data of each data port 630 and write to the system memory 640. The multiple view-port data switch 620 can be configured to align the data such that paging in the system memory 640 is reduced, thereby reducing latency and power consumption.

Figure 7:
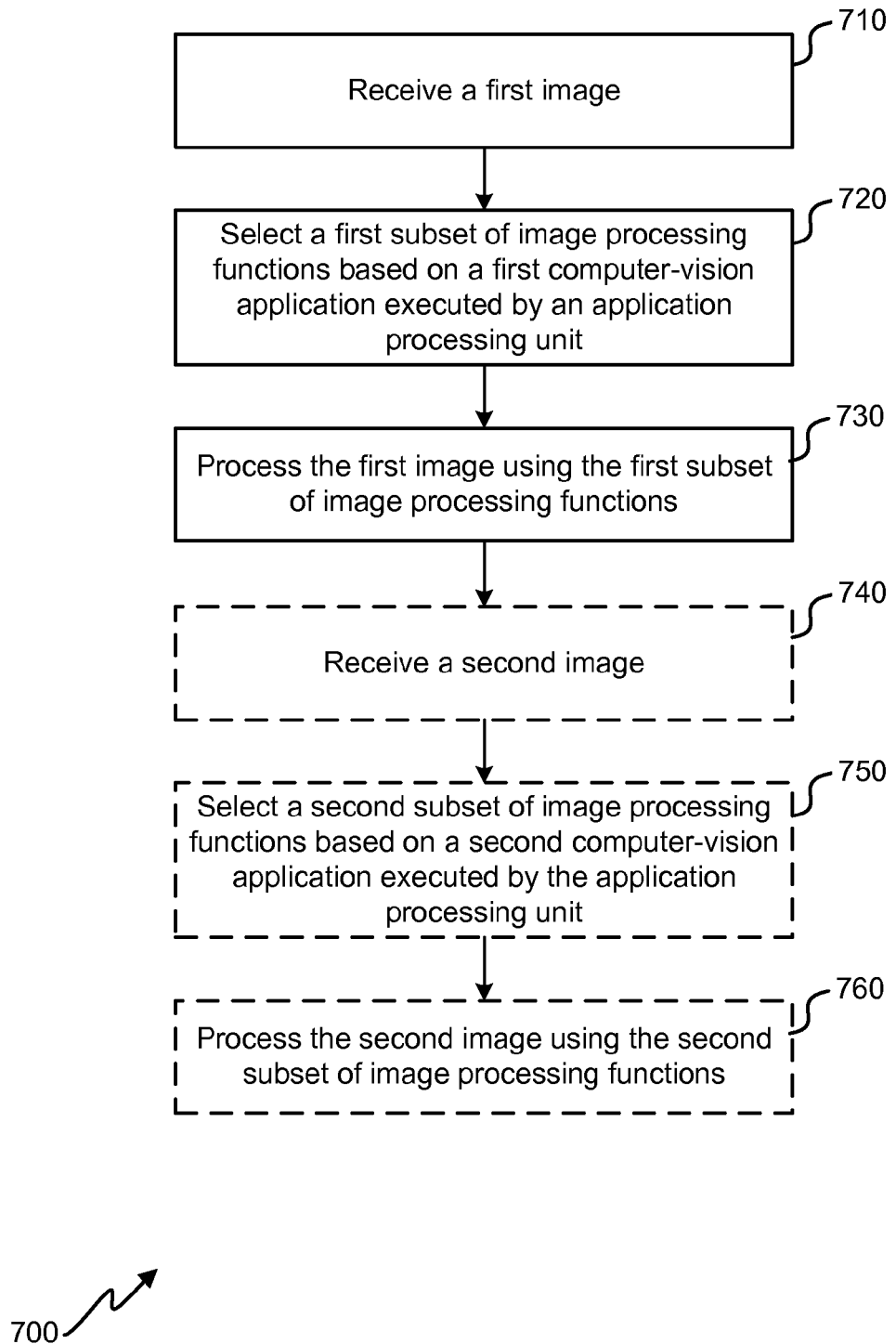
FIG. 7 illustrates an embodiment of a method for providing an adaptive data path for computer-vision applications, according to one embodiment.

FIG. 7 illustrates an embodiment of a method 700 for providing an adaptive data path for computer-vision applications. The method can be performed by, for example, a computer-vision processing unit, such as the computer-vision processing unit 120 of FIG. 1. Accordingly, means for performing each step of method 700 can include hardware and/or software components as described herein. In one embodiment, the method 700 may be performed by a specialized instruction-based, in-line processor. Furthermore, a memory subsystem of a device and/or memory internal to a computer-vision processing unit can be encoded with instructions for causing the device and/or computer-vision processing unit to perform one or more of the steps of the method 700.

At block 710, a first image is received. The image can be received from one or more sensor(s) of an image sensor module, for example the sensor(s) 115. In some embodiments, some preliminary filtering may occur to the image before it is received by, for example, a core data path.

At block 720, a first subset of image processing functions, or filters, is selected based on a first computer-vision application executed by an application processing unit. The first subset is selected from a plurality of image processing functions capable of being used in the processing of the first image. As indicated previously, selecting the first subset of image processing functions can be based on an input provided by the computer-vision application executed by an application processing unit, for example the application processing unit 130. The input can be, for example, a reference image. Where the method 700 is performed by a specialized computer-vision processing unit, the input can be an instruction-based command interpreted by the computer-vision processing unit without a separate interpretive engine. The input can include an instruction generated at the application layer by a computer-vision application. Additionally or alternatively, the computer-vision processing unit (and/or other hardware and/or software implementing the method 700) can be dynamically programmed, based on the input, to implement the selected image processing functions. The filters or functions may comprise any of the filters 315-355 or other filters not illustrated or described herein.

At block 730, the first image is processed using the first subset of image processing functions. Depending on desired functionality, and/or needs of the computer-vision application, an interrupt or other output can be provided to the application processing unit and/or a memory subsystem to cause either or both to exit a low-power mode. In some instances, a plurality of sub-image outputs from the first image can be provided, such as when a multiple view-port data switch is used to separate sub-images from a single image, as described previously in relation to FIG. 6

Optional blocks 740-760 illustrate the adaptability of the data path with regards to a second computer-vision application. At block 740, a second image is received, for example from sensor(s) 115. At block 750, a second subset of image processing functions is selected, for example from the functions 315-355 or other functions, based on a second computer-vision application executed by the application processing unit. Here, for example, the needs of the second computer-vision application can vary from the needs of the first computer-vision application, therefore resulting in the selection of a second subset of image processing functions, as illustrated above with regard to FIGS. 5A and 5B. However, as explained previously, not only can the data path alter the image processing functions used and/or the parameters of each image processing function based on different computer-vision applications executed by the application processing unit, but also alter the image processing functions used and/or the parameters of each image processing function based on the state of a particular computer-vision application. At block 760, the second image is processed using the second subset of image processing functions.

It should be appreciated that the specific steps illustrated in FIG. 7 illustrate an example method for providing an adaptive data path for computer-vision applications. Alternative embodiments may include alterations to the embodiments shown. Furthermore, additional features may be added or removed depending on the particular applications. One of ordinary skill in the art would recognize many variations, modifications, and alternatives.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. An apparatus for providing an adaptive data path, the apparatus comprising:
   an application processing unit; and
   a processing unit, separately programmable from the application processing unit, and communicatively coupled to an image sensor module and the application processing unit and configured to:
      receive a plurality of instruction-based commands from the application processing unit, based on an application executed by the application processing unit;
      receive a plurality of images from the image sensor module; and
      for each instruction-based command of the plurality of instruction-based commands:
         select a subset of image processing functions from a plurality of image processing functions, based on the instruction-based command wherein the processing unit is dynamically programmed to implement the selected subset of image processing functions; and
         process an image of the plurality of images using the selected subset of image processing functions.

2. The apparatus of claim 1, wherein the processing unit is further configured to:
   receive a new image from the image sensor module; and
   select a new subset of image processing functions from the plurality of image processing functions, wherein the new subset of image processing functions is based on a new instruction-based command; and
   process the new image using the new subset of image processing functions.

3. The apparatus of claim 1, wherein:
   at least one instruction-based command of the plurality of instruction-based commands comprises an instruction generated by a computer-vision application.

4. The apparatus of claim 1, wherein at least one instruction-based command of the plurality of instruction-based commands comprises an instruction generated at an application layer of the apparatus.

5. The apparatus of claim 1, wherein the processing unit is configured to process at least one image of the plurality of images based on a reference image maintained by the processing unit.

6. The apparatus of claim 1, further comprising a memory subsystem, wherein the processing unit is configured to provide an output that causes either or both the application processing unit or the memory subsystem to exit a low-power mode.

7. The apparatus of claim 1, wherein the processing unit is configured to provide a plurality of sub-image outputs from at least one image of the plurality of images.

8. The apparatus of claim 1, wherein the processing unit comprises an image signal processor.

9. A method for providing an adaptive data path, the method comprising:

receiving a plurality of instruction-based commands from an application processing unit, based on an application executed by the application processing unit;

receiving a plurality of images; and using a processing unit separate from the application processing unit to, for each instruction-based command of the plurality of instruction-based commands:

select a subset of image processing functions from a plurality of image processing functions, based on the instruction-based command, wherein the processing unit is dynamically programmed to implement the selected subset of image processing functions; and process, with the processing unit, an image of the plurality of images, using the selected subset of image processing functions.

10. The method of claim 9, further comprising:

receiving a new image;

selecting a new subset of image processing functions from the plurality of image processing functions, wherein the new subset of image processing functions is based on a new instruction-based command; and processing the new image using the new subset of image processing functions.

11. The method of claim 9, wherein at least one instruction-based command of the plurality of instruction-based commands comprises an instruction generated by a computer-vision application.

12. The method of claim 9, further comprising:

maintaining a reference image;

wherein processing at least one image of the plurality of instruction-based images is based on the reference image.

13. The method of claim 9, further comprising providing an output that causes either or both the application processing unit or a memory subsystem to exit a low-power mode.

14. The method of claim 9, further comprising providing a plurality of sub-image outputs from at least one image of the plurality of instruction-based images.

15. The method of claim 9, wherein processing at least one image of the plurality of instruction-based images is performed using an image signal processor.

16. A processor for providing an adaptive data path, the processor comprising:

means for receiving a first instruction-based command and a second instruction-based command from an application processing unit, based on an application executed by the application processing unit;

means for receiving a first image and a second image;

means for:

selecting a first subset of image processing functions from a plurality of image processing functions, based on the first instruction-based command, and selecting a second subset of image processing functions from the plurality of image processing functions, based on the second instruction-based command; and means for processing the first image using the first subset of image processing functions and the second image using the second subset of image processing functions, wherein:

the means for processing are separate from the application processing unit and are dynamically programmable to implement each of the first and second subsets of image processing functions; and the second subset of image processing functions is different than the first subset of image processing functions.

17. The processor of claim 16, comprising:

means for receiving a third image;

means for selecting a third subset of image processing functions from the plurality of image processing functions, wherein the third subset of image processing functions is:

based on a third instruction-based command; and different than the and second subsets of image processing functions; and means for processing the third image using the third subset of image processing functions.

18. The processor of claim 16, wherein the first instruction-based command comprises an instruction generated by a computer-vision application.

19. The processor of claim 16, further comprising means for maintaining a reference image, wherein the means for processing the first image are configured to process the first image based on the reference image.

20. The processor of claim 16, further comprising means for providing an output that causes either or both the application processing unit or a memory subsystem to exit a low-power mode.

21. The processor of claim 16, further comprising means for providing a plurality of sub-image outputs from the first image.

22. A non-transitory computer-readable medium encoded with instructions that, when executed, operate to cause a processing unit to perform operations comprising:

receiving a plurality of instruction-based commands from an application processing unit, based on an application executed by the application processing unit;

receiving a plurality of images; and for each instruction-based command of the plurality of instruction-based commands:

selecting a subset of image processing functions from a plurality of image processing functions, based on the instruction-based command;

causing a processing unit separate from the application processing unit to be dynamically programmed to implement the selected subset of image processing functions; and processing the image with the processing unit separate from the application processing unit, using the selected subset of image processing functions.

* * * * *